(12) United States Patent
Luebbe

(10) Patent No.: US 8,647,068 B2
(45) Date of Patent: Feb. 11, 2014

(54) BLADE TIP FOR A ROTOR BLADE OF A WIND TURBINE AND A METHOD OF INSERTING THE BLADE TIP INTO A ROTOR BLADE

(75) Inventor: Lutz Luebbe, Bentwisch (DE)

(73) Assignee: Nordex Energy GmbH, Rostock (DE)

( * ) Notice: Subject to any disclaimer, the term of this patent is extended or adjusted under 35 U.S.C. 154(b) by 619 days.

(21) Appl. No.: 12/942,729

(22) Filed: Nov. 9, 2010

(65) Prior Publication Data

US 2011/0110789 A1    May 12, 2011

(30) Foreign Application Priority Data

Nov. 10, 2009  (DE) .......................... 10 2009 046 586

(51) Int. Cl.
*F03D 11/00* (2006.01)
(52) U.S. Cl.
USPC .................................. 416/223 R; 416/245 R
(58) Field of Classification Search
USPC ...... 416/223 R, 224, 228, 235, 245 R, 245 A, 416/229 R, 229 A, 204 R, 238; 29/889.6, 29/889.7; 244/124; 403/373–374.5, 409.1

See application file for complete search history.

(56) References Cited

U.S. PATENT DOCUMENTS 3,720,480 A * 3/1973 Plowman et al. ......... 416/220 R

FOREIGN PATENT DOCUMENTS

DE   10 2005 051 537   5/2007
WO   WO-2005/031158    4/2005

* cited by examiner

*Primary Examiner* — Edward Look
*Assistant Examiner* — Maxime Adjagbe
(74) *Attorney, Agent, or Firm* — Jordan and Hamburg LLP

(57) ABSTRACT

A blade tip for a rotor blade of a wind turbine, and a method of inserting the blade tip into a rotor blade are provided. The blade tip for the rotor blade of a wind turbine simplifies the installation and the replacement of the blade tip as well as a method of inserting such a blade tip. The blade tip can be inserted by means of an adjustable clamping wedge so as to simplify replacement of the tip if necessary. The associated method of inserting the blade tip outside the shell mould removes the likelihood of damage to the shell mould due to sawing.

11 Claims, 3 Drawing Sheets

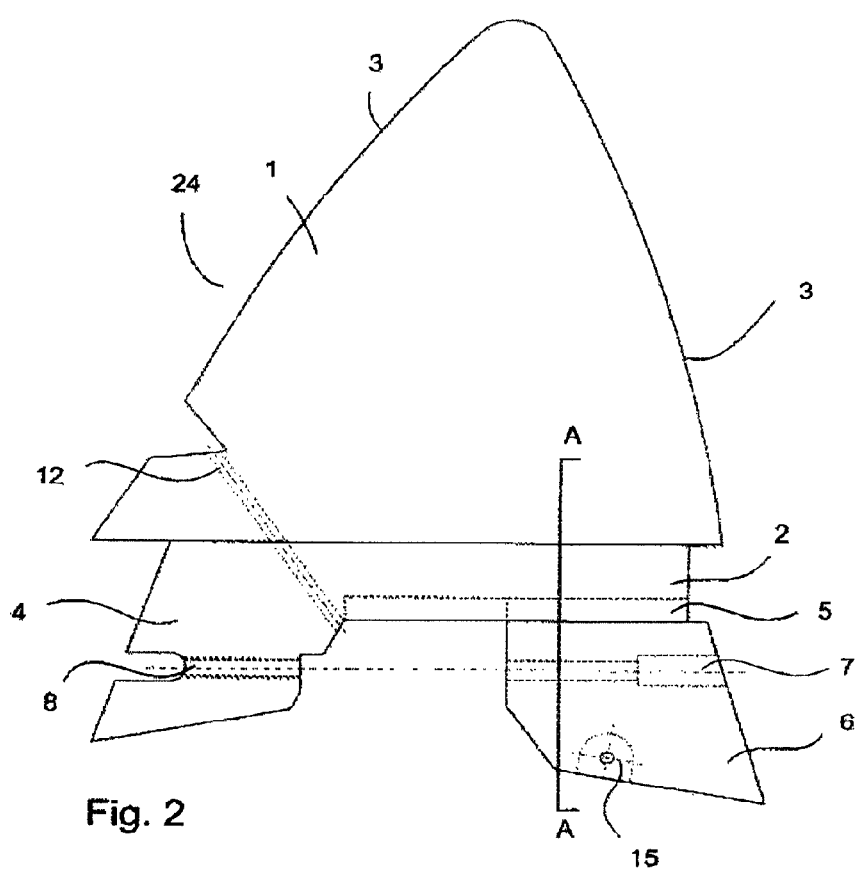
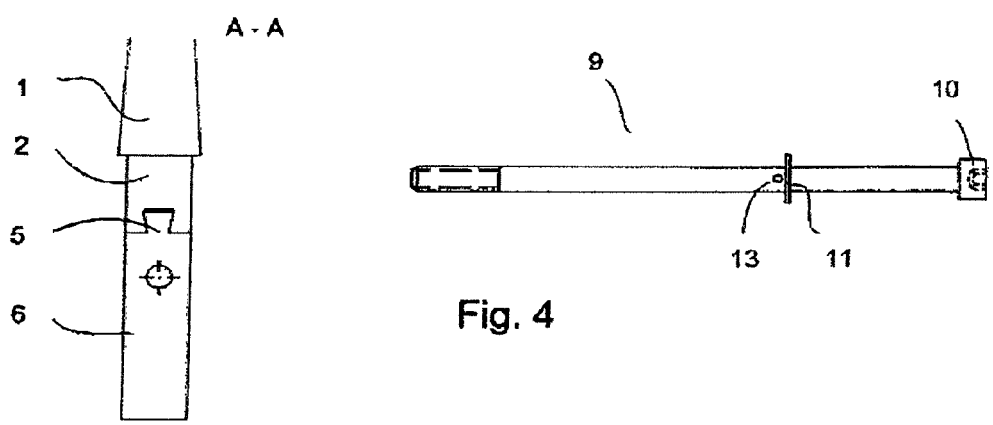
Fig. 2
Fig. 3
Fig. 4

BLADE TIP FOR A ROTOR BLADE OF A WIND TURBINE AND A METHOD OF INSERTING THE BLADE TIP INTO A ROTOR BLADE

BACKGROUND OF THE INVENTION

The invention relates to a blade tip for a rotor blade of a wind turbine and a method of inserting the blade tip into a rotor blade.

Rotor blades for wind turbines predominantly consist of glass fibre reinforced plastic, and are usually fabricated in half shells. The rotor blades are equipped with a lightning protection system which comprises a plurality of receptors and a cable system. The main receptor is formed through the blade tip shaped from aluminium. The striking lightning is guided by the receptors through the cable located inside the rotor blade for earth connection. As a rule, the blade tip is usually fabricated as a separate member and is integrated during assembly of the rotor blade. The prior art discloses retrofittable blade tips.

DE 102005051537 A1 discloses a method for the supplementary installation of a lightning protection system in at least one rotor blade of an existing wind turbine. For this purpose, the tip of the rotor blade is removed along a predetermined dividing line. A replacement tip made of electrically conductive material and being adapted to the shape of the rotor blade is attached and secured to the dividing line. Subsequently, an electric line is connected to the earth connection.

In WO 2005031158 A2, there is disclosed a lighting protection device which consists of a blade tip having at least a segment of a compact metal. The blade tip comprises three to six connecting rods which engage in the apertures in the rotor blade structure and are bonded therein. The blade tip is partly made of metal and thus has a high weight whereby high precision is required during assembly.

DETAILED DESCRIPTION OF THE INVENTION

The invention provides a blade tip for a rotor blade of a wind turbine which simplifies the installation and the replacement of the blade tip as well as a method of inserting such a blade tip.

In doing so, the blade tip can be inserted by means of an adjustable clamping wedge. Thus, with occurring damages the blade tip is easily replaceable. The blade tip can be inserted in any rotor blades.

The blade tip according to the invention comprises a structure matching the rotor blade, a joining piece connected to the structure and a clamping wedge. Preferably, the structure and the joining piece are formed in a one-piece manner. Similarly, the joining piece can be inserted into the structure or joined to it. The clamping wedge is positively connected to a flattened face of the joining piece.

The dimensions of the joining piece are matched to the inner dimensions of the rotor blade.

In one embodiment the joining piece comprises a one-sided guide which has a shape being sphenoid toward the outside. The one-sided guide approximately takes up one third of the width of the joining piece, and protrudes into the rotor blade about two thirds further than the remaining joining piece portion.

The clamping wedge is movably supported on the flattened face of the joining piece. Preferably, the positive joint is a dovetail joint. However, other positive joints enabling a translational movement of the clamping wedge are also contemplated.

Into the clamping wedge and the guide, there are fitted bores which are aligned and into which a threaded bolt can be inserted. On the threaded bolt, there is disposed a washer which can be locked by means of a grooved pin.

The method according to the invention provides for inserting the blade tip into a rotor blade of a wind turbine and includes:
  passing a threaded bolt through a clamping wedge;
  slipping a washer onto the threaded bolt wherein the washer is locked in a predetermined position by means of a grooved pin;
  slipping the clamping wedge onto a flattened face of a joining piece;
  joining the clamping wedge with a one-sided guide by screwing the threaded bolt into the one-sided guide;
  inserting the blade tip into the rotor blade; and
  bracing the blade tip in the rotor blade by screwing the threaded bolt out of the one-sided guide.

According to the invention, a lightning protection cable is connected to a threaded bushing provided prior to inserting the blade tip into the rotor blade.

In one embodiment, the blade tip may be glued in. Then, bracing the blade tip in the rotor blade is carried out before the adhesive is cured. Templates can be used to insert the blade tip.

Through the method according to the invention installing the blade tip can be brought about outside the shell mould so that no damage to the shell mould is caused by sawing the rotor blade inside the mould.

The blade tip according to the invention can be inserted during the fabrication of the rotor blades or afterwards. The blade tip is designed such that it can be inserted into the raw blade after de-moulding or into the rotor blade after lacquering, respectively. For this, the area of the blade tip has to be left open during bonding of the rotor blade. Gluing of the new blade tip, if required, can be carried out in a defined manner. The blade tip according to the invention can be easily replaced. It is suitable to be inserted into a rotor blade afterwards, e.g. in connection with repair work on blade tips damaged due to lightning strike or for retrofitting rotor blades of wind turbines having no lightning protection system.

BRIEF DESCRIPTION OF THE DRAWINGS

The invention will be explained in more detail on the basis of drawings, in which
FIG. 2 is a cross-section of the blade tip according to the invention;
FIG. 3 is a section A-A of the blade tip from FIG. 2;
FIG. 4 is a threaded bolt.

DETAILED DESCRIPTION OF THE INVENTION

Figure 1:
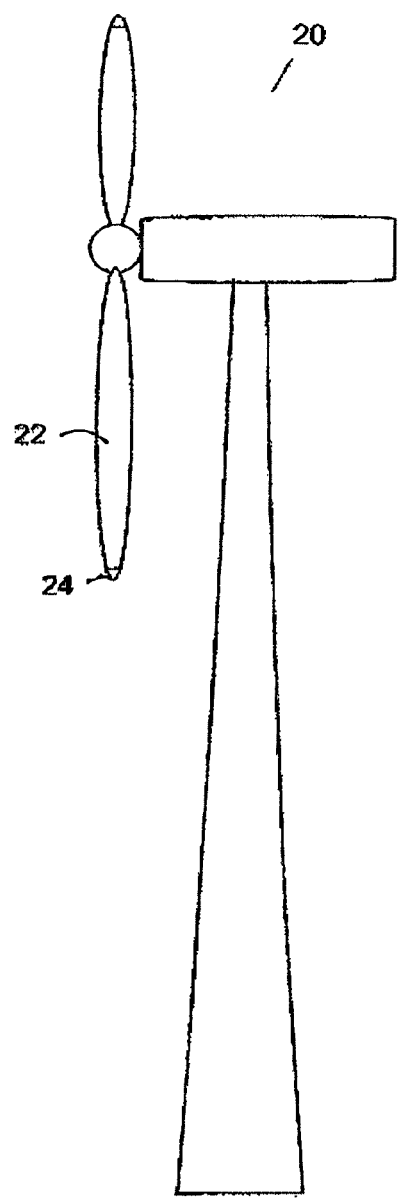
FIG. 1 is a schematic representation of a wind turbine.

FIG. 1 shows a wind turbine 20 the rotor blades 22 of which having separate blade tips 24.

The blade tip 24 according to the invention is shown in FIG. 2. It comprises a structure 1 which is fabricated true to size to the rotor blade 22. The structure 1 is connected to a joining piece 2. The joining piece 2 is spaced from the marginal areas 3 and formed with the structure 1 in a one-piece manner. The dimensions of the joining piece 2 are matched to the inner dimensions of a receptacle in the rotor blade 22 such that the blade tip 24 can be inserted into the rotor blade 22. Preferably, the depth of the joining piece 2 is flat, and on one side it has a guide 4 being sphenoid to the outside. The sphenoid guide 4 takes up about one third of the joining piece width and protrudes into the rotor blade 22 about two thirds longer than the remaining joining piece 2. A dovetail groove 5 is recessed at the flattened face of the joining piece 2. FIG. 3 shows the layout in the section A-A. Into the groove 5, there is inserted a clamping wedge 6 being sphenoid toward the outer face on one side, and is thus supported in the groove 5 in a slidably and torsionally stiff manner. In principle other joints can be used which enable the clamping wedge 6 to be pushed in the direction of the guide 4. The width and depth of the clamping wedge 6 is designed according to the sphenoid guide 4. The length of the clamping wedge 6 corresponds to the length of the sphenoid guide 4 and is contemplated to be greater than the length thereof. The bores 7 and 8 align relative to each other and are provided in the clamping wedge 6 and the guide 4, respectively. The bore 8 located in the sphenoid guide 4 is provided with a thread. The threaded bolt 9 shown in FIG. 4 is passed through the bore 7 in the clamping wedge 6 such that the head 10 of the threaded bolt 9 is completely within the bore 7 of the clamping wedge 6. The head 10 is provided with a receptacle for a tool such as an internal hexagon. On the bolt 9 immediately past the clamping wedge 6, there is placed a washer 11 which is coffered with a grooved pin 13, for example. Insertion of the bolt 9 can take place during the preassembly. The clamping wedge 6 having the inserted bolt 9 included therewith is pushed into the groove 5, and the bolt 9 is screwed into the internal threaded bore 8 of the one-sidedguide 4. As a result, the clamping wedge 6 moves toward the guide 4. The clamping wedge 6 is pushed in the direction of the guide 4 thus far until inserting the blade tip 24 into the rotorblade 22 is possible. Subsequently, the lightning protection cable 14 is attached to the threaded bushing 15 provided for it, and the blade tip 24 is inserted into the rotor blade 22.

Figure 5:
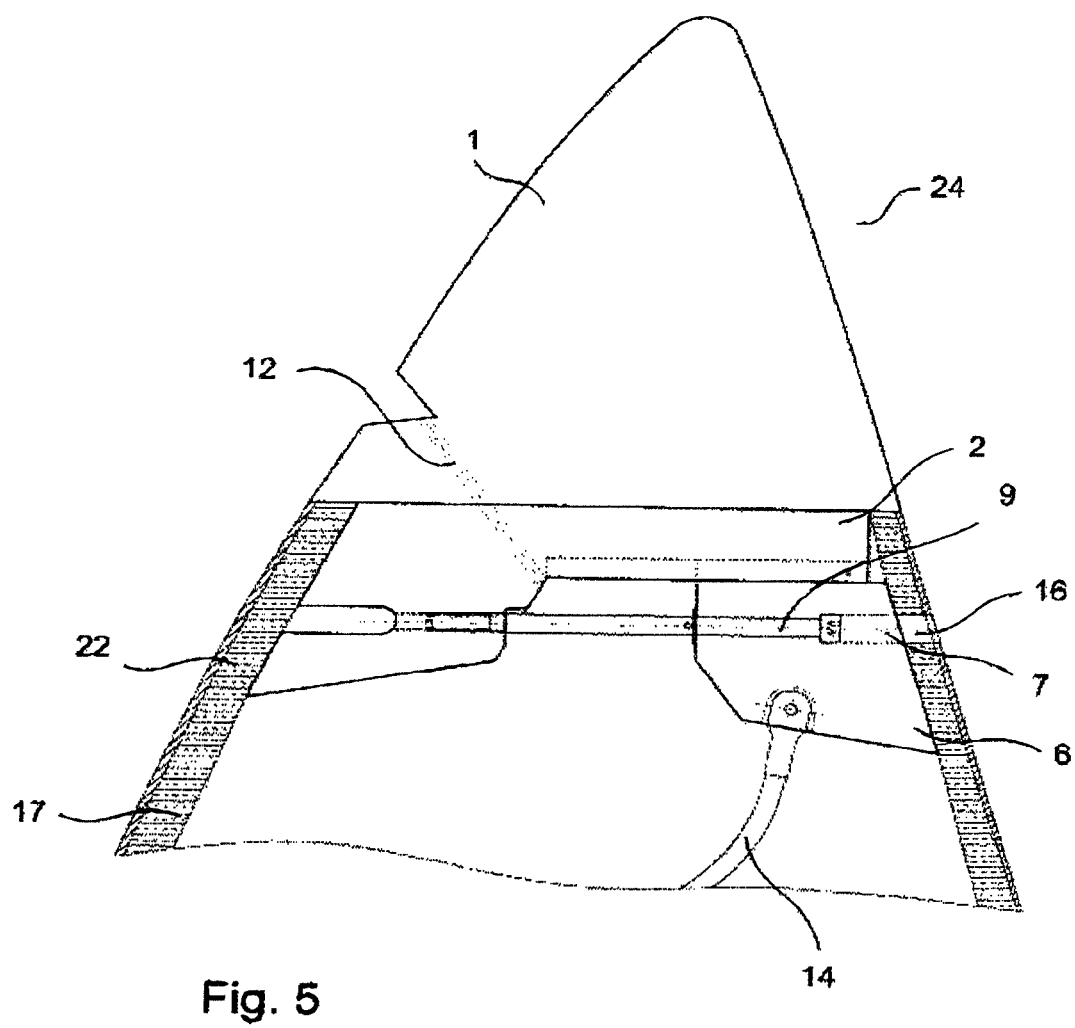
FIG. 5 is a cross-section of the blade tip inserted into a rotor blade.

FIG. 5 shows a blade tip 24 having a connected lightning protection cable 14 which is inserted into a rotor blade 22. The bore 7 in the clamping wedge 6 corresponds to a bore 16 located in the rotor blade 22. A tool, not shown, can be inserted through this bore 16. By screwing out the bolt 9 by means of the tool the clamping wedge 6 moves to the outside and braces the blade tip 24 in the rotor blade 22. The blade tip 24 is inserted by means of a contour template not shown, and is braced prior to curing of the adhesive 17 in the rotor blade 22. After the blade tip 24 has been inserted the bore 16 is closed, and the drainage hole 12 extending across the structure 1 up into the joining piece 2 is cleared.

What is claimed is:

1. A blade tip for a rotor blade of a wind turbine, comprising:
    a structure true to size to said rotor blade,
    a joining piece connected to said structure,
    and a clamping wedge, said clamping wedge being positively connected to a flattened face of said joining piece, said joining piece having a one-sided guide portion, and said one-sided guide portion having a shape being sphenoid toward the outside.
2. The blade tip of claim 1, wherein
    said one-sided guide comprises about one third of the width of said joining piece, and protrudes into said rotor blade about two thirds further than said remaining joining piece portion.
3. The blade tip of claim 1, wherein
    said clamping wedge is movably supported on the flattened face of said joining piece.
4. The blade tip of claim 1, wherein
    said positive connection is a dovetail joint.
5. A blade tip for a rotor blade of a wind turbine, comprising:
    a structure true to size to said rotor blade,
    a joining piece connected to said structure,
    and a clamping wedge, said clamping wedge being positively connected to a flattened face of said joining piece, and in said clamping wedge and said guide, bores are provided which are aligned relative to each other so as to receive a threaded bolt therein.
6. The blade tip of claim 5, wherein
    a washer is locked by means of a grooved pin and disposed on said threaded bolt.
7. A method of inserting a blade tip into a rotor blade of a wind turbine, comprising:
    passing a threaded bolt through a clamping wedge;
    slipping a washer onto said threaded bolt, said washer being locked in a predetermined position by means of a grooved pin;
    slipping said clamping wedge on a flattened face of a joining piece;
    joining said clamping wedge with a one-sided guide portion of said blade tip by screwing said threaded bolt into said one-sided guide;
    inserting said blade tip into said rotor blade; and
    bracing said blade tip in said rotor blade by screwing said threaded bolt out of said one-sided guide.
8. The method of claim 7, wherein
    prior to inserting said blade tip into said rotor blade a lightning protection cable is connected.
9. The method of claim 7, wherein
    said blade tip is glued into said rotor blade.
10. The method of claim 7, wherein
    templates are used for inserting said blade tip.
11. The blade tip of claim 1, wherein
    the dimensions of said joining piece are matched to the inner dimensions of said rotor blade.

* * * * *